Patented Nov. 18, 1952

2,618,569

UNITED STATES PATENT OFFICE 2,618,569

CALKING COMPOUNDS

Kenneth Louton, Des Plaines, Ill.

No Drawing. Application October 8, 1949,
Serial No. 120,421

14 Claims. (Cl. 106—245)

The present invention relates to a plastic compound and, in particular, to a calking compound suitable for filling cracks, seams and joints between wood, brick, cement or metal and any combination of such materials or like materials.

The calking compounds heretofore available are somewhat unsatisfactory inasmuch as they fail to seal, for any length of time, the cracks or seams into which an application has been made, due to shrinkage which takes place as the calking material ages, or due to the failure of the calking compound to adhere to the material to which it is applied. Furthermore, existing compounds are objectionable because they crack during the aging process. There may be other factors which cause the failure of existing calking compounds to retain a seal after they have been applied, but the above-mentioned objections clearly illustrate the most common faults in existing calking compounds.

Heretofore, a thorough calking job could not be done unless the cracks, seams, etc., in the surfaces to be calked were first neutralized with a weak acid solution and then coated with a suitable primer. The weak acid solution neutralized the alkali found on surfaces, such as cement and brick, and the primer provided the contact surface for the calking compound. Extreme care was required to prevent the primer from thoroughly sealing the pores in the surfaces and thereby interfering with the bond between the calking compound and the surfaces to which it was applied. The above preliminary operations consumed a considerable part of the time required to complete any calking job and consequently the cost thereof was increased proportionately. In order to reduce the cost of calking jobs, these operations are omitted in many instances and consequently results in an inferior and sometimes a completely unsatisfactory calking job.

Accordingly, it is an object of the present invention to provide a calking compound which retains its softness and plasticity over long periods of time and which adheres to and fills joints in wood, brick, cement, metal and the like construction materials or the joints between the various combinations of such materials without cracking.

Another object of the invention is to improve the adhesive qualities of the calking compound by providing an agent which will act as a neutralizer of the alkali on the surfaces of the materials to which it is applied and which will also etch such surfaces and thus provide a microscopic roughness on surfaces in order to increase the surface bond between the calking compound and the material to which it is applied.

It is a further object of the invention to provide an improved calking compound containing an ingredient which will perform the functions noted above and which will not destroy the characteristics of the various materials included in the calking compound and which will not generate a gas by reaction with those materials.

The calking compound may be prepared in accordance with the following table:

| Ingredients | Parts by Weight | Approx. Percentage |
|---|---|---|
| Oil | 270 | 32 |
| Oleum Spirits | 86 | 10 |
| Floats | 86 | 10 |
| Titanium-Calcium | 75 | 9 |
| Filler | 300 | 36 |
| Calcium-Linoleate | 4 | ½ |
| Cobalt dryer | 2 | ½ |
| 55% acetic acid | 10 | 1½ |
| 70% chlorinated paraffin | 4 | ½ |

The above ingredients are placed in a mixing chamber or vat at room temperature and when they are thoroughly mixed will become a uniform putty-like mass which may be packaged in any desired manner for commercial distribution. This compound will adhere to the various surfaces previously noted with greater tenacity than any of the known calking compounds and, in addition thereto, it will not harden, crack or separate from the surfaces of the materials to which it has been applied. Finally, it may be readily applied into cracks, seams and joints in any desirable manner, such, for example, as by means of a putty knife, calking gun or the like.

The foregoing formula has been found to be very satisfactory and it illustrates one form of applicant's calking compound, but it should be understood that a wide latitude in the choice of ingredients is possible in the production of the final compound since the improved results are primarily obtained from the acetic acid. By way of illustrating the wide choice in the selection of raw materials, each of the ingredients will be discussed below.

The oil included in the formula may be blown soya oil, fish oil, China-wood oil, peanut oil, vegetable oils, etc. (or any combination thereof since the oil is merely provided as a binder for the mass).

The oleum spirits included in the typical formula may also be kerosene etc., since it is provided to act as a solvent.

The floats included in the compound may be ground asbestos or any other fibrous material which will act as a binder for the mass and will thereby prevent the finished compound from being too liquid.

The titanium-calcium included in the compound comprises approximately 35% titanium dioxide, which provides the coloring for the material, and approximately 65% calcium sulfate, which is an extender or inert substance and has very little, if any, chemical reaction. This ingredient may be used interchangeably with other materials which would provide the desired coloring, such as black, red, brown, etc. It should also be understood that the titanium-calcium may be omitted if the compound is not to be colored, in which event it will be a natural gray color.

The filler in the compound comprises approximately 65% calcium magnesium carbonate and approximately 35% calcium magnesium silicate. This ingredient is provided as an extender and it will not react with the acetic acid and generate a gas, such as carbon dioxide, which would cause expansion of the container for the calking compound. If other fillers are substituted for the filler described above, they must be of the type which will not react with acetic acid.

The calcium linoleate included in the compound is a soap pulp which is provided for its emulsifying properties. It retards the separation of the ingredients and provides a body that tends to keep the ingredients in suspension during the mixing period and also when the compound remains in storage after it has been produced. Ordinary soap and water could be substituted, but it has been found that calcium linoleate is satisfactory.

The cobalt dryer included in the compound comprises metallic cobalt and is commonly referred to as metallic soap. This ingredient is included in the compound to provide a surface dryer therefor and causes a thin film to be formed over the compound after it has been applied to a surface and thus exposed to the atmosphere.

The 55% acetic acid included in the compound provides the wetting agent which overcomes the surface tension to which the compound is applied. In addition to the foregoing, the acetic acid acts as a neutralizer of the alkali which may be found upon the surface of the materials to which the calking compound is applied in order to increase the adhesion of the compound to such surfaces. It will also etch the surface of the materials to which the compound is applied and thereby provide microscopically roughened surfaces to which the compound may adhere. The acetic acid is a factor in preventing the calking compound from drying out during the aging process due to the fact that it neutralizes the action of any alkali on the surface of materials to which it is applied and thereby prevents separation from the surfaces to which the compound is applied. Other acids may be substituted for the acetic acid provided such acids are approximately the same acidity or are diluted to the acidity of 55% acetic acid. It has been found, however, that certain acids, such as hydrochloric acid and sulphuric acid, even though diluted as stated above, are not as stable as acetic acid, although they may be used in the composition. However, diluted phosphoric acid is somewhat objectionable, since it tends to make the calking compound too stiff for normal use. The acetic acid is preferred because it is harmless and easy to handle whereas the strong acids, such as phosphoric, hydrochloric and sulphuric, prior to dilution thereof, are extremely dangerous and difficult to handle.

The 70% chlorinated paraffin included in the compound is in powdered form and prevents the compound from becoming too fluid. This ingredient is applied to the formula to act as a plasticizer and thereby prevents cracking and also aids in increasing the adhesive qualities of the compound.

In preparing calking compounds to be applied to rough, sandy surfaces, such as concrete and brick, it has been found that ordinary washed torpedo sand (silicon dioxide) may be added to the compound. Sand provides a satisfactory bulking ingredient since it absorbs very little of the oil in the compound. One hundred to two hundred parts by weight of sand may be added to the compound and the oil in such a compound should be increased from 270 to 278 parts by weight if 100 parts by weight of sand is added. If 200 parts by weight of sand is added, then the oil should be increased to 286 parts by weight. If the 100 parts by weight of sand is added, then the filler may be reduced proportionately from 200 to 175 parts by weight and if 200 parts by weight of sand is added, the filler should be reduced to 150 parts by weight.

The ingredients included in any calking compound may be classified generally as pigments and vehicles and the latter classification may be further divided into volatile and non-volatile vehicles. The pigments of the improved calking compound include the floats, the titanium-calcium, the filler and the cobalt dryer; the volatile vehicles include the oleum spirits and the acid; and the non-volatile vehicles include the oil, the calcium-linoleate and the chlorinated paraffin.

It has been found that the amount of 55% acetic acid included in the calking compound may be varied from approximately one-tenth of one per cent to approximately two per cent without materially affecting the character of the calking compound except to vary the amount of neutralizing and etching that takes place on the surfaces to which it is applied. If a greater amount than two per cent of 55% acetic acid is included in the calking compound, the acid has a tendency to deteriorate the storage containers. Accordingly, it is recommended that less than two per cent of the 55% acetic acid be included in the compound unless some precautionary measure is taken to prevent the acid from attacking the storage containers.

From the foregoing, it will be understood that a wide choice of raw materials may be used in preparing the calking compound and the main factor in determining the ingredients to be used is the cost of such materials on the commercial market.

What is claimed is:

1. A calking compound capable of etching and/or neutralizing a surface to which it is applied comprising approximately: 32% of an oil selected from the class consisting of a vegetable drying oil and a glyceride semi-drying oil, 10% of a solvent, 10% of a fibrous asbestos binder, ½% of a soap pulp emulsifier, one-tenth of 1% to 2% of an acid having an acidity of 55% acetic acid, a dryer, and the balance being substantially all inorganic filler to render the compound the same consistency as glazing putty.

2. A calking compound as set forth in claim 1, and further comprising approximately ½% of powdered chlorinated paraffin as a plasticizer.

3. A calking compound as set forth in claim 1, in which the filler consists essentially of approximately 65% calcium magnesium carbonate and approximately 35% calcium magnesium silicate.

4. A calking compound as set forth in claim 1, in which the oil is blown soya oil.

5. A calking compound capable of neutralizing and/or microscopically etching a surface to which it is applied comprising: 55½% pigment including a fibrous asbestos binder, an inorganic filler and a dryer; 33% non-volatile vehicle including an oil selected from the class consisting of a vegetable drying oil and a glyceride semi-drying oil, an emulsifier, and a plasticizer; and 11½% volatile vehicle including a solvent, and from one-tenth of 1% to 2% of an acid having an acidity of 55% acetic acid.

6. A calking compound as set forth in claim 5, in which the filler constitutes substantially 36% of the pigment and consists of 65% calcium magnesium carbonate and 35% calcium magnesium silicate.

7. A calking compound as set forth in claim 5, in which the oil constitutes substantially 32% of the non-volatile vehicle and is fish oil.

8. A calking compound as set forth in claim 5, in which the solvent is oleum spirits.

9. A calking compound adapted to seal joints, cracks and seams between wood, brick, concrete and metal, and combinations of such materials, and which is capable of neutralizing the alkali on such materials and/or microscopically etching such materials comprising the following ingredients in approximately the stated proportions: 55½% pigment including 10% of inorganic fibrous binder, 36% of inorganic filler, ½% of metallic soap surface dryer, and 9% coloring; 33% non-volatile vehicle including 32% of an oil selected from the class consisting of a vegetable drying and a glyceride semi-drying oils, ½% of soap emulsifier, and ½% of a plasticizer; and 11½% volatile vehicle including 10% of a solvent, and from one-tenth of 1% to 2% of an acid having an acidity of 55% acetic acid.

10. A calking compound adapted to seal joints, cracks and seams between wood, brick, concrete and metal, and combinations of such materials, and which is capable of neutralizing the alkali on such materials and/or microscopically etching such materials comprising the following ingredients in approximately the stated proportions: 55½% pigment including 10% fibrous asbestos binder, 36% inorganic filler, 9% titanium-calcium, and ½% cobalt dryer; 33% non-volatile vehicle including 32% of an oil selected from the class consisting of a vegetable drying and a glyceride semi-drying oils, ½% calcium linoleate, and ½% of 70% chlorinated paraffine; and 11½% volatile vehicle including 10% oleum spirits, and one-tenth of 1% to 2% of 55% acetic acid.

11. A calking compound as set forth in claim 1, in which the oil is China-wood oil.

12. A calking compound as set forth in claim 1, in which the oil is peanut oil.

13. A calking compound as set forth in claim 1, in which the oil is fish oil.

14. A calking compound as set forth in claim 5, in which the solvent is kerosene.

KENNETH LOUTON.

REFERENCES CITED

The following references are of record in the file of this patent:

UNITED STATES PATENTS

| Number | Name | Date |
| --- | --- | --- |
| 490,548 | Doyle | Jan. 24, 1893 |
| 1,587,016 | McGill | June 1, 1926 |
| 1,975,783 | Gauerke | Oct. 9, 1934 |
| 2,124,288 | Dodd | July 19, 1938 |
| 2,246,452 | McGrew | June 17, 1941 |

OTHER REFERENCES

"The Chemical Formulary," Bennett, pg. 21, vol. II (1935) (cement for securing earthenware to iron).